United States Patent [19]

Kaun et al.

[11] Patent Number: 4,851,306
[45] Date of Patent: Jul. 25, 1989

[54] MOLTEN SALT ELECTROLYTE BATTERY CELL WITH OVERCHARGE TOLERANCE

[75] Inventors: Thomas D. Kaun, New Lenox; Paul A. Nelson, Wheaton, both of Ill.

[73] Assignee: Arch Development Corporation, Argonne, Ill.

[21] Appl. No.: 219,740

[22] Filed: Jul. 18, 1988

[51] Int. Cl.$^4$ .............................................. H01M 4/40
[52] U.S. Cl. ...................................... 429/112; 429/218; 429/221; 429/223; 29/623.1
[58] Field of Search ............... 429/112, 218, 221, 223; 252/182.1; 29/623.1

[56] References Cited

U.S. PATENT DOCUMENTS

| | | | |
|---|---|---|---|
| 4,172,926 | 10/1979 | Shimotake et al. | 429/112 |
| 4,324,846 | 4/1982 | Kaun et al. | 429/112 |
| 4,446,212 | 5/1984 | Kaun | 429/103 |

Primary Examiner—Anthony Skapars
Attorney, Agent, or Firm—Hill, Van Santen, Steadman & Simpson

[57] ABSTRACT

A molten salt electrolyte battery having an increased overcharge tolerance employs a negative electrode with two lithium alloy phases of different electrochemical potential, one of which allows self-discharge rates which permits battery cell equalization.

11 Claims, 3 Drawing Sheets

MOLTEN SALT ELECTROLYTE BATTERY CELL WITH OVERCHARGE TOLERANCE

CONTRACTUAL ORIGIN OF THE INVENTION

The invention described herein was made in the course of Contract No. W-31-109-ENG-38 with the U.S. Department of Energy and Argonne National Laboratories.

BACKGROUND OF THE INVENTION

The present invention relates to lithium alloy batteries, and particularly to batteries having cells with electrodes formed of Li alloy/FeS or Li alloy/$FeS_2$, having a high degree of overcharge tolerance.

Overcharge tolerance is desirable in lithium batteries, especially batteries having multiple cells, because it is usual for individual ones of a plurality of cells to have a different state of charge at a given time. Thus, when an effort is made to recharge the battery from a discharged condition, some of the cells reach their fully charged state before the other cells do. A continuation of charging beyond this point has the undesirable effect of overcharging the fully charged cells, which results in permanent damage to the battery, i.e., current collector oxidation with resulting deposition of metal particles to bridge the electrodes. Alternatively, if the charging operation is stopped when only one of the cells is fully charged, then the overall potential capacity of the battery is not realized, because all but one of the cells of the battery are only partially charged.

Attempts have been made in the past to address this problem by providing circuitry such as electronic control units for charging only the cells of the battery which have not reached their fully charged state. However, such circuitry is complex, expensive, and cumbersome. It is therefore desirable to develop an apparatus and mechanism whereby the plurality of cells of the battery may be fully charged without exposing the battery to permanent damage.

It has been proposed to develop a lithium battery with an improved overcharge capacity. For example, U.S. Pat. No. 4,324,846 suggests such a battery. The battery of U.S. Pat. No. 4,324,846 provides a negative electrode which has additional capacity at an increased lithium activity. This results in a cell having an overcharge characteristic in which the voltage level of the cell rises, during charging, steeply from about 1.5 volts to 1.8 volts. This results in a characteristic curve which is undesirable in that it does not exhibit a constant voltage output. In the arrangement described in the aforesaid patent, a tradeoff is necessary between the magnitude of the voltage discontinuity, and the amount of overcharge protection which is available.

Prior constructions of lithium alloy batteries have experienced the disadvantage of tending to form electrically conductive particles or other constituents during operation, especially during charging, through oxidation of a current collector. This adversely affects performance because the conductive constituents allow short circuit currents within the battery, which limits the available power and eliminates the capacity of that cell. It has been found that these disadvantages are caused by use of a boron nitride (an insulator) as the matrix for holding the cell's electrolyte, which can be converted to a conductive form in high lithium activity. It is therefore desirable to provide an electrolyte matrix which has less tendency to form electrically conductive constituents.

The electrolyte in previous use in lithium batteries has a relatively high melting point, which requires that the batteries be used at relatively high temperatures, over 400° C. It is desirable to modify the electrolyte to allow operation at lower temperatures, as well as to increase the lithium ion content, which we have discovered will sustain a higher rate of reversible self discharge than previously appeared possible.

SUMMARY OF THE INVENTION

It is a principal object of the present invention to provide a lithium battery having a plurality of cells, each of which has overcharge capacity exhibited by a characteristic curve which has a plateau in the overcharge region.

It is another object of the present invention to provide a lithium battery having a plurality of cells in which each of the cells exhibits a bimodal self-discharge characteristic, with the self-discharge of a cell being markly greater during operation in the overcharge region, whereby the self-discharge is equal to the trickle charging current, without forming conductive constituents which result in physical short circuits.

A further object of the present invention is to provide a lithium battery having a plurality of cells which is capable of functioning satisfactorily at a relatively low temperatures, and with a higher lithium ion concentration electrolyte.

Another object of the present invention is to provide a lithium battery having a plurality of cells having an overcharge region at a selected part of the characteristic curve, to allow a battery design which on the one hand is capable of rapid charging without risking damage to the cell through overcharging with an overcharge region established at an elevated but safe voltage, or on the other hand a battery having greater relative capacity but which can be safely trickle charged at a lower rate due to an overcharge region established at the elevated cell voltage.

These and other objects and advantages of the present invention will be made manifest by review of the following description and accompanying drawings.

In accordance with one embodiment of the present invention there is provided a lithium alloy battery having a plurality of cells, each of which has an electrode formed of FeS or $FeS_2$, and an electrode formed of two alloys comprising LiAl, and 2%–25% of its capacity of an alloy of lithium, aluminium and iron, with 2 mol % to 50 mol % of the iron in such alloy being substituted with nickel or cobalt, with an electrolyte having increased lithium ion concentration.

BRIEF DESCRIPTION OF THE DRAWINGS

Reference will now be made to the accompanying drawings in which.

DESCRIPTION OF THE PREFERRED EMBODIMENT

Figure 1:
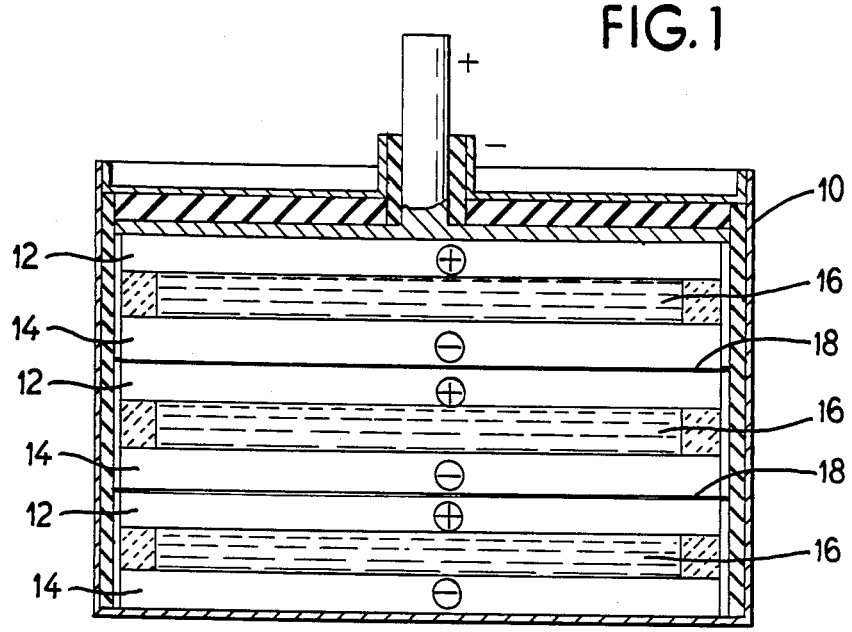
FIG. 1 is a diagrammatic illustration of a lithium alloy battery having a plurality of cells constructed in accordance with an illustrative embodiment of the present invention.

Referring now to FIG. 1, a schematic illustration of a lithium battery is shown having a case 10, a plurality of positive electrodes 12, and a plurality of negative electrodes 14, each pair of positive and negative electrodes with intervening electrolyte matrix layer forming a cell. Adjacent cells are separated by conductive sheets 18, and the electrodes of each cell are separated by an electrolyte matrix 16 which is a thin porous member saturated with electrolyte. Terminals 20 supply power from the battery to an external electrical circuit.

It can be seen that the battery illustrated in FIG. 1 has a total voltage proportional to the number of cells it contains, since all are connected in series. When a charging current is supplied to such a battery, the current runs in series through each of the cells, with the result that the charging current in each cell is identical.

The effect of the charging current is to support a electro-chemical reaction in which lithium-aluminium is formed from the reduction of lithium ions as the voltage exhibited across the cell increases during charging.

Figure 2A:
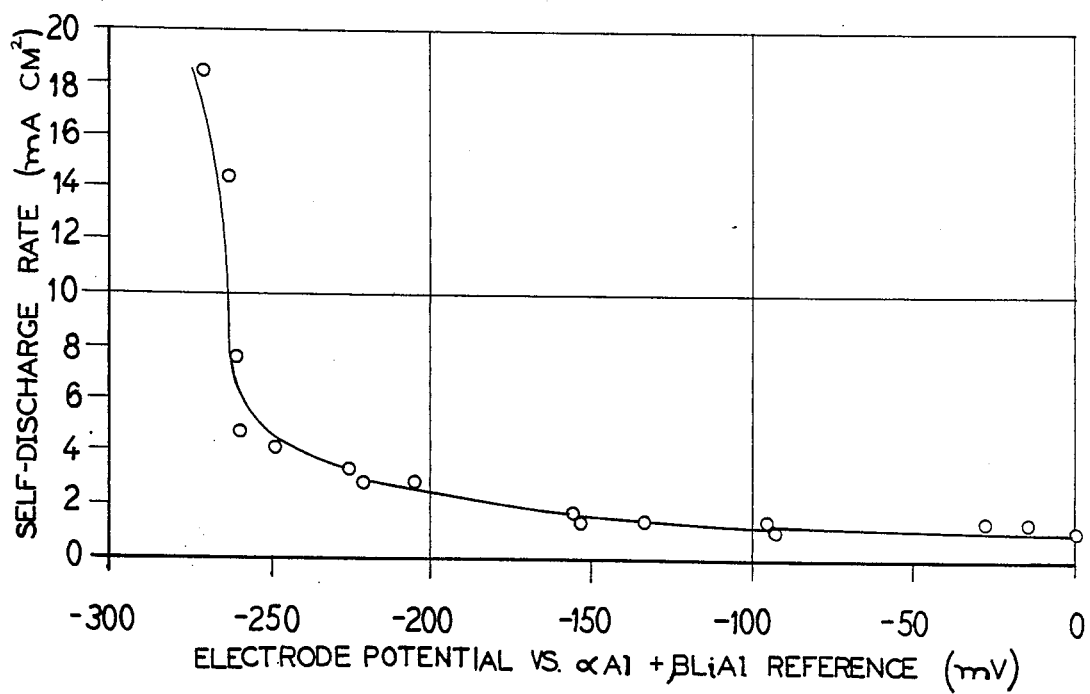
FIG. 2a is a graph illustrating the self-discharge current rate of a cell, relative to the electro-chemical potential, along an extending continuum from lithium to a lithium-aluminium alloy.

Each cell has a self-discharge current, which rises during the charging operation, as illustrated in FIG. 2a, as lithium aluminium or other lithium alloys such as LiSi, LiAlSi, and LiAlFe, accept additional lithium. This is a chemical self discharge current, which is the result of a reversible chemical reaction, and so it does not represent damage to the cell which would be occasioned by an irreversible deposit of conductive constituents. The irreversible reaction is characterized by:

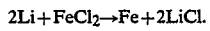

$$2Li + FeCl_2 \rightarrow Fe + 2LiCl.$$

Figure 2B:
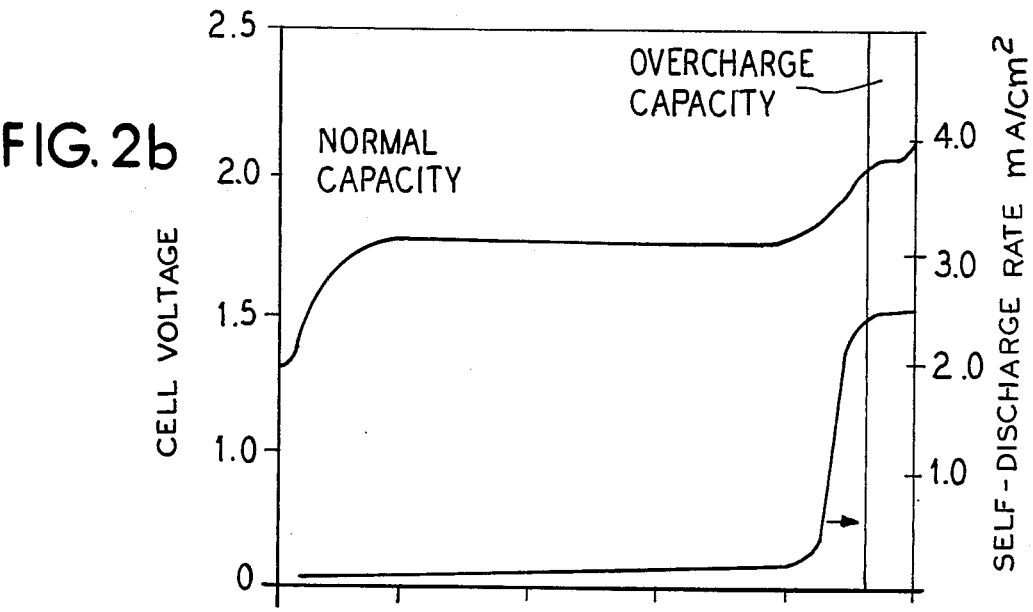
FIG. 2b is a graph showing the change in self discharge rate that is provided by the two phase lithium alloy electrode that allows trickle charge tolerance and battery cell equalization.

The self-discharge current rises asymptotically as the electro-chemical potential of the negative electrode approaches minus 300 millivolts relative to that of $\alpha$ aluminum -$\beta$ LiAl alloy. However, when a portion of the lithium-aluminium alloy (viz. 2%–25% of the capacity) is replaced by the alloy of $Li_5Al_5Fe_2$ in which 2 mol % to 50 mol % of the iron is substituted by nickel or cobalt, the curve illustrated in FIG. 2b is modified so that the self discharging current reaches a maximum equal to a trickle charging current suitable for battery cell equilization, viz., 2 or more milliamperes per square centimeter of electrolyte matrix area. Then no further charging takes place. This results from the process of dissolution of the lithium at the negative electrode, diffusion through the electrolyte matrix, and reduction at the positive electrode, which is formed of FeS or FeS₂. This may be referred to as a lithium shuttle self discharge mechanism.

As a result, the onset of the overcharge region begins when the cell is charged to 75% to 98% of its theoretical capacity, with the overcharge region itself occupying 2% to 25% of the capacity, according to the amount of $Li_5Al_5[Fe+Ni]$ which is substituted for LiAl. Additionally, the Fe+Ni constituent can be varied over the range of 2 mol % to 50 mol % Ni. Increasing the nickel concentration over this range results in the potential in the overcharge region being less negative relative to the LiAl reference and determine the trickle charge rate that can be tolerated. Below this rate a trickle charge may be applied to the battery indefinitely, without harming it, and all of the cells can become fully charged, so that the full battery capacity is realized. The curve of FIG. 2b shows a 20 fold increase in self discharge rate for a cell having a negative electrode of $Li_5Al_5Fe_{1.8}Ni_{0.2}$ as shown, a plateau is reached as the battery is charged into the overcharge region (moving rightwardly as shown in FIG. 2b).

A battery made in accordance with the present invention allows a long time trickle charge of 2.5 milliamperes per square centimeter of electrolyte matrix area, for a battery using lithium alloy cells with FeS₂ electrodes. This rate of trickle charge is sufficient to equalize battery cell capacities in 2 to 6 hours.

Figure 3:
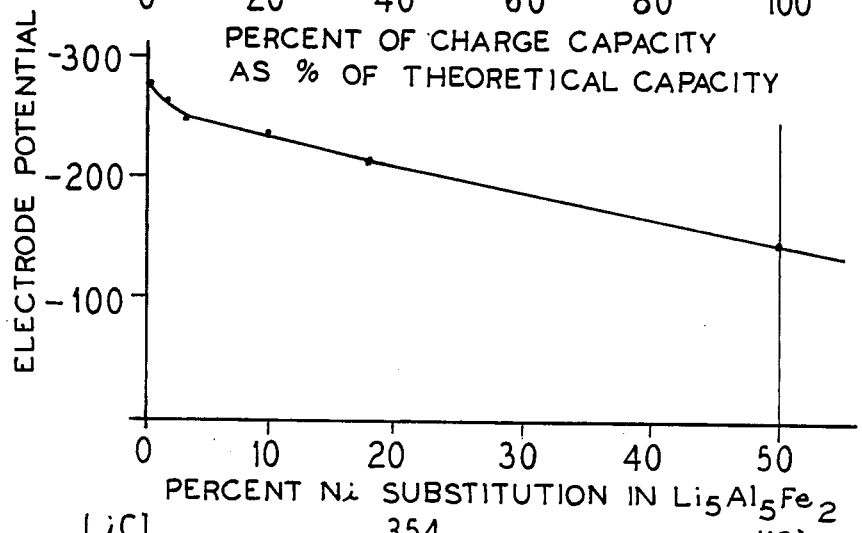
FIG. 3 is a chart illustrating the effect of nickel substitution for iron in the lithium alloy to change the electro-chemical potential of the resulting lithium electrode.

FIG. 3 illustrates a curve showing the effect of nickel substitution for iron in the lithium-aluminium-iron alloy, which changes the electro-chemical potential of the higher lithium activity plateau. As shown by the curve, the electro-chemical potential, in comparison to the electro-chemical potential of an LiAl reference electrode, is about negative 270 millivolts when no nickel is used, and increases to approximately negative 150 millivolts when the nickel substitution for the iron is 50 mol Thus, by selecting the amount of iron to be substituted by nickel, the shape of the characteristic curve 2b of the cell can be modified, with the result that the overcharge region of the curve (at which there is no further charging because the self-discharge current equals the charging current) begins at a selected potential between minus 150 millivolts and about minus 270 millivolts relative to the LiAl reference electrode.

When the cell operates in the overcharge region, the self discharge rate of the cell increases to equal the trickle charging current, with the result that there is no added charge capacity on the cell once the overcharging region is reached. Meanwhile, other cells which are serially connected in the battery of FIG. 1, can continue to charge capacity until each of them is fully charged, without bringing about any permanent damage to the battery.

The lithium alloy electrode has two distinct stats of lithium activity, or electro-chemical potential. This provides a cell with a bimodal self-discharge rate characteristic. In its higher self-discharge mode, the cell can be trickle charged with 0% efficiency, which establishes an overcharge tolerance. In the normal capacity state, the self-discharge rate is 0.2 to 0.5 ma per square cm of the area of the electrolyte matrix. In the overcharge state, the self discharge is in the range of 2 to 10 ma per square cm.

Figure 5A:
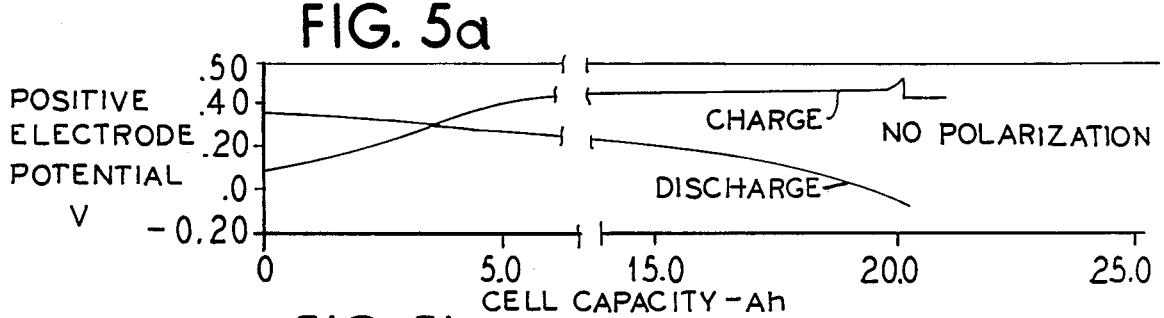
FIGS. 5a–5c and 6a–6c are groups of curves illustrating electro-chemical potential and current at various conditions charged and discharged by a battery with an FeS₂ electrode and an FeS electrode, respectively.
Figure 5B:
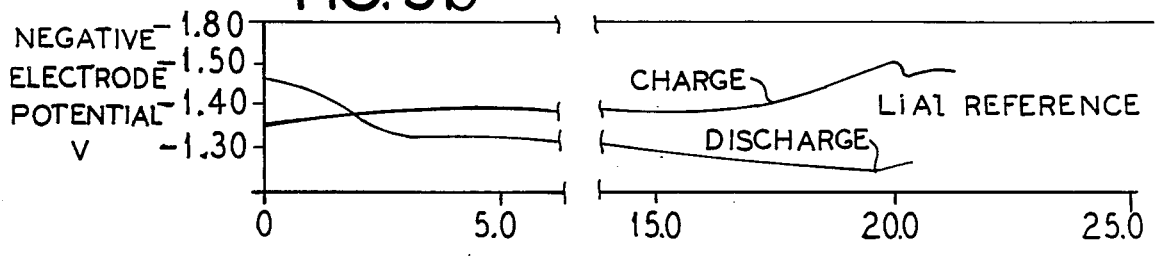
Figure 5C:
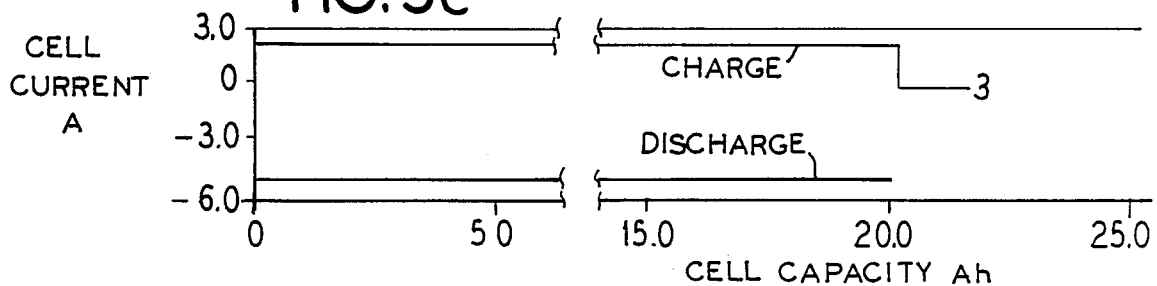
Figure 6A:
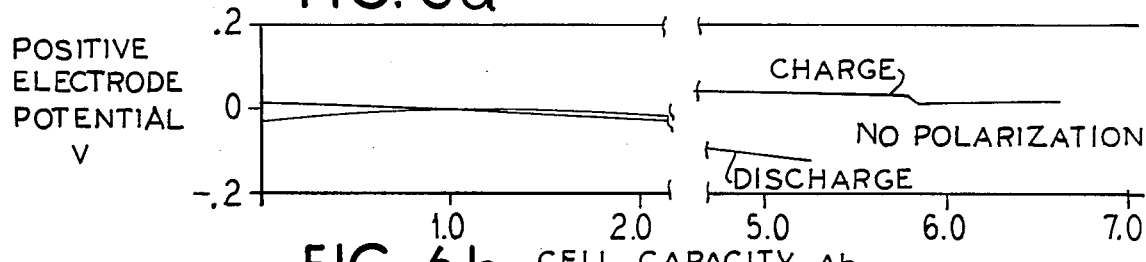
Figure 6B:
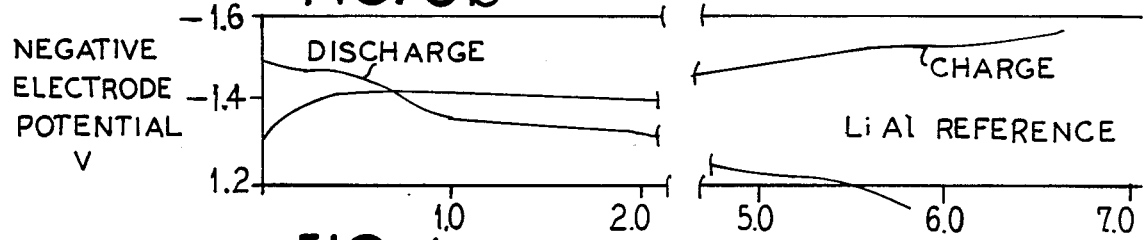
Figure 6C:
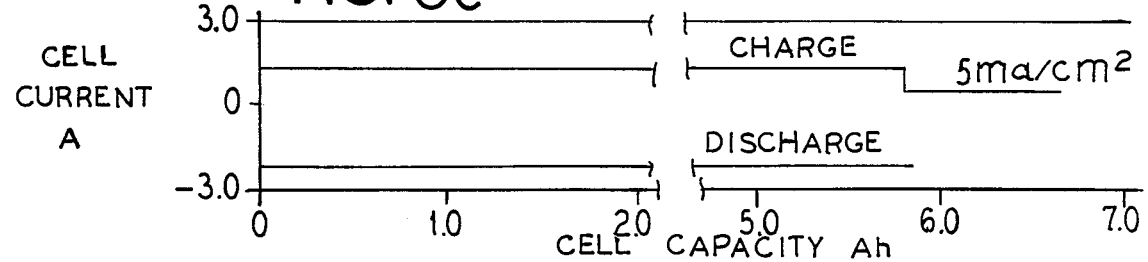

FIG. 5 illustrates a series of curves which illustrate the condition of the cells of a battery with FeS₂ electrodes during charging and discharging. FIG. 5a shows the positive electrode potential of a cell during charging and discharging, and shows an overcharge plateau occurring as the overcharge region is reached. FIG. 5b shows the negative electrode potential during these periods. FIG. 5c shows the charging current and the discharging current for the cell. The cell potentials are relative to a reference electrode of $Ni_3S_2$.

In all of FIGS. 5a–5d, a step is seen in the charging characteristic as the overcharging region is reached. There the cell voltage is reduced abruptly by a small amount when switched to trickle charge and afterwards exhibits a plateau. The lithium alloy potential and the FeS potential exhibits similar plateaus during this region, but there is no change in cell charging current. FIG. 5 indicates that the FeS$_2$ cell, which uses the LiCl—LiB—KBr electrolyte (at 400°) can be charged an additional 5% at 3 ma/cm$^2$ without positive electrode polarization, indicating that no destructive overcharge of the current collector has occurred. The area of the electrode was about 100 cm$^2$.

The battery of FIG. 1 incorporates an electrolyte matrix 16 in each cell, which separates the positive and negative electrodes of each cell. The electrolyte matrices are preferably formed of porous or sponge-like magnesium oxide, which holds the electrolyte. The electrolyte is preferably formed of a mixture of potassium bromide, lithium bromide, and lithium chloride, which mixture has a relatively low melting point of 310° C. so that operation of the FeS$_2$ or FeS battery is possible while the electrolyte is maintained in a liquid condition at a relatively low temperature, below 400° C.

Figure 4:
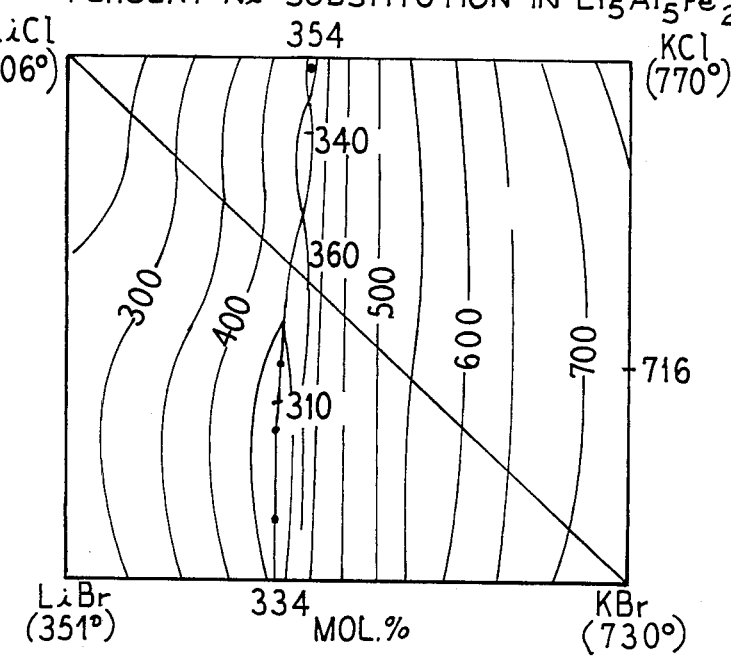
FIG. 4 is a phase diagram for an electrolyte having a melting point of 310° C. used with the FeS₂ electrode.

FIG. 4 illustrates a phase diagram with a melting point in approximately the middle of the diagram of 310° C., preferred for use with an FeS$_2$ electrode. An electrolyte of lithium foride, lithium chloride and lithium bromide is preferred for use with and FeS electrode, but operation at a higher temperature is necessary, viz., at about 475° C. The phase diagram of FIG. 4 illustrates that a considerable liquid area is available at 400° C. or under, so that this electrolyte enables operation at less than 400° C., using an electrolyte incorporating potassium bromide, lithium bromide, and lithium chloride in a relative broad range of constituents. Potassium chloride is shown at one corner of the phase diagram because of the presence of potassium and chloride ions in the combined electrolyte. See U.S. patent application Ser. No. 868,388 filed May 29, 1986 for a further discussion of electrolytes. The disclosure thereof is incorporated by reference.

The electrolyte matrices 16 of the cell of the present invention are preferably formed of magnesium oxide, instead of boron nitride, which has conventionally been used. Alternatively, ceramics that are chemically stable with lithium may be used, such as aluminium nitride or BeO.

The improved composition of the electrolyte matrix of the present battery facilitates construction of the battery by making unnecessary the use of boron nitride. The necessity of using boron nitride in the past has led to difficulties in the formation of conductive constituents, such as for example, metallic boron or lithium borate, which degrade the performance of the battery, and is avoided by the use of magnesium oxide.

The electrolyte matrices 16 are preferably about 0.2 mm to 2.0 mm thick, and have a porosity of 50% to 90%, so that they allow a rapid rate of diffusion of the lithium, but still achieve physical stability. Preferably, they are of two layer construction, with MgO on the positive side and BN belt material at the negative side.

The material of the electrolyte matrices may be formed in a variety of ways. For example, they can be formed by melting electrolyte with MgO particles, and forming particles of the result when cooled. The particles are then cold pressed into the required shape. Alternatively a high temperature slurry can be made of the MgO particles, and drawn out into sheet form and allowed to solidify. Alternatively, the MgO particles may be mixed with an organic binder such as kerosene, toluene or petroleum ether.

The present invention allows design of the self discharge rate of a cell for its overcharge capacity to provide overcharge tolerance at low current density.

The electrodes of FeS or FeS$_2$ described above, may be formulated with additional constituents, if desired, such as NiS$_2$ or CoS$_2$. Such formulations may be referred to in general as transition metals.

It will be apparent that various modifications and/or additions in the apparatus and methods of the present invention can be made by those skilled in the art without departing from the essential features of novelty of the present invention, which are intended to be defined and secured by the appended claims.

What is claimed is:

1. A lithium alloy battery having a plurality of cells, each with a positive electrode formed of FeS or FeS$_2$, and a negative electrode formed of two lithium alloy phases, one of aluminium and the other of aluminium and iron, with 2 mol % to 50 mol % of the iron in said alloy being substituted with either nickel or cobalt to define the position of the overcharge region in the electro chemical characteristic, a plurality of electrolyte matrices separating said positive and negative electrodes formed of porous magnesium oxide, said electrolyte matrices holding an electrolyte formed of a mixture of potassium bromide, lithium bromide, and lithium chloride.

2. The battery according to claim 1 in which said electrolyte comprises a eutectic mixture which is liquid under 400° C.

3. The battery according to claim 1, in which said two lithium alloy phases are separated by at least 150 mv. of lithium activity; one of said alloys of minus 270 to 150 and the other of 0 to minus 150 mv. relative to $\alpha$Al+$\beta$LiAl alloy.

4. The battery according to claim 1, having a lithium activity plateau which begins at 75% to 98% of the theoretical maximum capacity of the battery, the position of said plateau being adjustable by adjusting the proportion of iron which is substituted with nickel or cobalt, to provide an adjustment of the charge rate and an adjustment of trickle charge tolerance to enable battery cell equalization.

5. A method of producing a lithium alloy battery having, improved resistance to destructive overcharging comprising the steps of providing a plurality of serially connected cells, each with a positive electrode formed of FeS or FeS$_2$, and a negative electrode formed of two lithium alloy phases, one of aluminum and the other of aluminum and iron, and substituting with either nickel or cobalt, a proportion of 2 mol % to 50 mol % of the iron in said alloy, to define the electro-chemical level of an overcharge zone at which self-discharge current is approximately equal to trickle charging current.

6. The method according to claim 5, including the step of employing magnesium oxide as an electrolyte matrix.

7. The method according to claim 6, including the step of using an electrolyte formed as a mixture of potassium bromide, lithium bromide and lithium chloride having at least 62 mol % lithium cations.

8. The method according to claim 6, including the step of using an electrolyte formed as a mixture of lithium fluoride, lithium bromide, and lithium chloride.

9. The method according to claim 7, including the step of using an electrolyte which is liquid under 400° C.

10. The method according to claim 5, including the step of selecting said two lithium alloy phases to have a difference of at least 150 millivolts in electrochemical activity, one of said alloys of minus 270 to 150 and the other of 0 to minus 150 mv, relative to $\alpha Al + \beta LiAl$ alloy.

11. A method of producing a lithium alloy battery having improved resistance to destructive overcharging, comprising the steps of providing at least one cell with a positive electrode formed of transition metal sulfides and a negative electrode formed of two lithium alloy phases, said two phases being selected with a difference of at least 150 millivolts in electrical activity in the minus 300 millivolts to 0 millivolts relative to $\alpha Al + \beta LiAl$ reference, and electrolyte having at least 62 mol % lithium cations.

* * * * *